(12) United States Patent
Heath et al.

(10) Patent No.: US 12,085,332 B2
(45) Date of Patent: *Sep. 10, 2024

(54) THERMALLY CONTROLLABLE CUPHOLDER

(71) Applicants: Lakeside Holdings, LLC, West Bloomfield, MI (US); Advanced Electric, Inc., Clarklake, MI (US)

(72) Inventors: Derek Heath, West Bloomfield, MI (US); Doug Heath, Novi, MI (US); Andrew Slaby, Clarklake, MI (US)

(73) Assignees: LAKESIDE HOLDINGS, LLC, West Bloomfield, MI (US); ADVANCED ELECTRIC, INC., Clarklake, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,415

(22) Filed: May 8, 2023

(65) Prior Publication Data

US 2023/0272970 A1 Aug. 31, 2023

Related U.S. Application Data

(63) Continuation of application No. 17/012,231, filed on Sep. 4, 2020, now Pat. No. 11,680,745.

(Continued)

(51) Int. Cl.
*F25D 31/00* (2006.01)
*B60N 3/10* (2006.01)

(Continued)

(52) U.S. Cl.
CPC ......... *F25D 31/007* (2013.01); *B60N 3/104* (2013.01); *F25B 21/04* (2013.01); *F25D 25/005* (2013.01);

(Continued)

(58) Field of Classification Search
CPC . F25D 31/007; F25D 2331/809; B60N 3/104; B60N 3/106; F25B 21/04;

(Continued)

(56) References Cited

U.S. PATENT DOCUMENTS 3,844,172 A 10/1974 Jeric
6,121,585 A 9/2000 Dam (Continued)

FOREIGN PATENT DOCUMENTS

CN 111942250 A 11/2020
DE 102011000527 A1 8/2012

(Continued)

*Primary Examiner* — Steve S Tanenbaum
(74) *Attorney, Agent, or Firm* — REISING ETHINGTON P.C.

(57) ABSTRACT

A thermally controllable cupholder that is advantageously designed for marine and other outdoor implementations. The thermally controllable cupholder includes a beverage receptacle and a thermal control device configured to change a temperature of the beverage receptacle. In one embodiment, the cupholder includes a drain passageway and a drain hole that connects the beverage receptacle to the drain passageway. In one embodiment, the cupholder includes a perforated heat sink to promote the thermal conductivity of the thermal control device.

16 Claims, 5 Drawing Sheets

Related U.S. Application Data

(60) Provisional application No. 62/896,045, filed on Sep. 5, 2019.

(51) Int. Cl.
    *F25B 21/04*     (2006.01)
    *F25D 25/00*     (2006.01)

(52) U.S. Cl.
    CPC . *F25B 2321/0211* (2013.01); *F25B 2321/023* (2013.01); *F25B 2321/025* (2013.01); *F25D 2331/809* (2013.01)

(58) Field of Classification Search
    CPC ........ F25B 2321/0211; F25B 2321/023; F25B 2321/025; F25B 2321/0251
    USPC ....................................................... 62/457.4
    See application file for complete search history.

(56) References Cited

U.S. PATENT DOCUMENTS

| | | | |
|---|---|---|---|
| 6,422,300 B1 | 7/2002 | Wylin | |
| 7,089,749 B1 | 8/2006 | Contino | |
| 7,500,443 B1* | 3/2009 | Allen | B63B 45/04 248/311.2 |
| 7,805,959 B2 | 10/2010 | Webb et al. | |
| 8,555,656 B2 | 10/2013 | Al-Qaffas | |
| 9,242,598 B2 | 1/2016 | Mayer et al. | |
| 9,416,994 B2 | 8/2016 | Oh et al. | |
| 9,975,462 B2 | 5/2018 | Doi | |
| 10,906,379 B1 | 2/2021 | O'Brien | |
| 11,377,011 B2 | 7/2022 | Vite et al. | |
| 2006/0048519 A1* | 3/2006 | Childress | F25B 21/04 62/3.3 |
| 2016/0018138 A1* | 1/2016 | Liptak | B60N 3/00 62/3.3 |
| 2016/0236605 A1* | 8/2016 | Doi | F25D 31/007 |
| 2016/0339822 A1* | 11/2016 | Park | B60N 3/104 |
| 2018/0079344 A1* | 3/2018 | Uhlenbusch | F25B 21/04 |
| 2018/0251058 A1* | 9/2018 | Dalton | B60N 3/101 |
| 2018/0252467 A1 | 9/2018 | Neal | |
| 2019/0049173 A1* | 2/2019 | Jabou | F25D 23/10 |
| 2022/0010963 A1 | 1/2022 | Kazee | |
| 2023/0264619 A1 | 8/2023 | MacLauchlan | |

FOREIGN PATENT DOCUMENTS

| | | |
|---|---|---|
| DE | 102012009550 A1 | 12/2012 |
| EP | 2676842 | 4/2022 |
| KR | 200446940 Y1 | 12/2009 |

\* cited by examiner

THERMALLY CONTROLLABLE CUPHOLDER

CROSS-REFERENCE TO RELATED APPLICATION

This application is a continuation of U.S. Non-Provisional application Ser. No. 17/012,231 filed Sep. 4, 2020, which claims the benefit of U.S. Provisional Application No. 62/896,045 filed Sep. 5, 2019, the entire contents of which are hereby incorporated by reference.

TECHNICAL FIELD

This invention generally relates to cupholders, and more particularly, to thermally controllable cupholders for marine applications.

BACKGROUND

Cupholders in marine applications, such as in boats, yachts, and other watercraft, may have different requirements than cupholders for other vehicle applications. For example, in marine applications, the cupholders are more environmentally exposed, so issues such as water intake and power control may be more prevalent. Accordingly, when designing cupholders with increased functionality, such as providing for thermal management, it may be more challenging to implement such functionalities given the increased environmental exposure.

SUMMARY

According to one embodiment, there is provided a thermally controllable cupholder comprising a beverage receptacle, a drain passageway, a drain hole, and a thermal control device. The drain hole connects the beverage receptacle to the drain passageway, and the thermal control device is configured to change a temperature of the beverage receptacle.

According to another embodiment, there is provided a thermally controllable cupholder comprising a beverage receptacle and a thermal control device configured to change a temperature of the beverage receptacle. The thermal control device includes a perforated heat sink.

According to another embodiment, there is provided a thermally controllable cupholder comprising a beverage receptacle, a drain passageway, and a thermal control device configured to change a temperature of the beverage receptacle. The thermal control device includes a heat sink that at least partially surrounds the drain passageway.

DRAWINGS

Preferred exemplary embodiments will hereinafter be described in conjunction with the appended drawings, wherein like designations denote like elements, and wherein.

DESCRIPTION

The thermally controllable cupholder embodiments disclosed herein may be used in various marine applications to help enhance the user's experience while addressing certain challenges that may exist due to increased environmental exposure of the cupholder. Further, energy usage may be more of a concern in marine applications, as compared with other vehicles, so increasing efficiency of the thermally controlled cupholder can be advantageous. In some embodiments, the thermally controllable cupholder includes a drain passageway with the thermal control device of the cupholder particularly configured to accommodate the drain passageway. This can help accommodate the increased environmental exposure, as fluid can efficiently drain from the beverage receptacle. In one particular embodiment, a cylindrical, perforated heat sink is situated to at least partially surround the drain passageway. The perforated heat sink can promote increased heat removal while accommodating fluid flow through the cupholder assembly. In yet other embodiments, however, there may not be a perforated heat sink, and an alternative finned design may be used.

Figure 1:
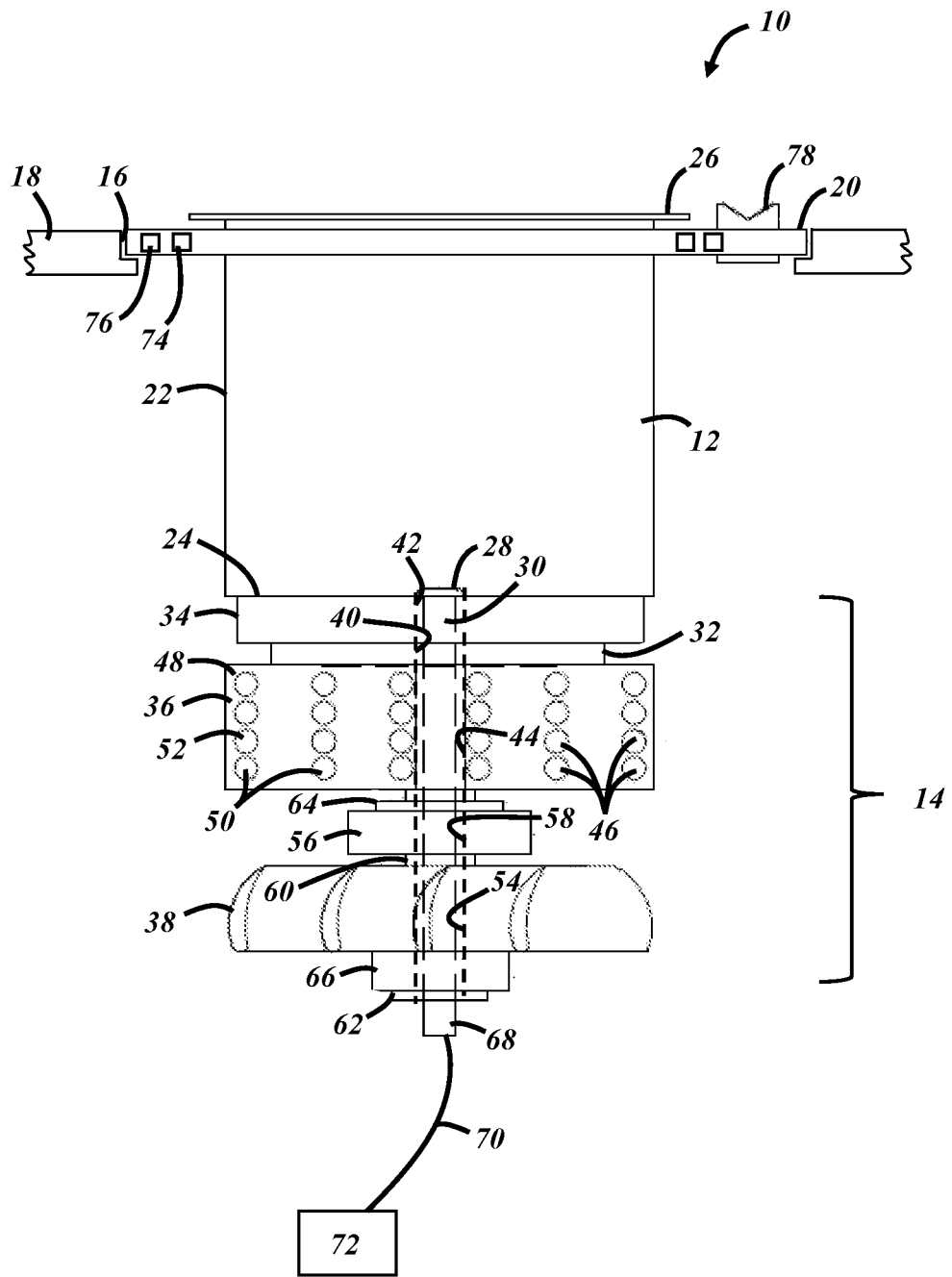
FIG. 1 is a schematic of a thermally controllable cupholder according to one embodiment.

FIG. 1 illustrates a thermally controllable cupholder 10 in accordance with one embodiment. The thermally controllable cupholder 10 includes a beverage receptacle 12 and a thermal control device 14. The thermally controllable cupholder 10 is installed in an opening 16 in a marine vehicle 18 such as a boat or yacht. While the thermally controllable cupholder 10 has a number of features that make it desirable for use in a marine vehicle, a number of the features may also be useful in thermally controllable cupholders for other applications, such as land-based vehicles or other implementations. For example, the thermally controllable cupholder 10 may be advantageously employed in recreational vehicles or RVs. In the illustrated embodiment, the opening 16 may be located in a boat console, armrest, or any other desirable location. The thermally controllable cupholder 10 may be a flush mount as schematically illustrated, or a bezel 20 may sit atop the mounting surface, to cite a few examples. Insulation can additionally be provided around one or more components of the thermally controllable cupholder, such as around the beverage receptacle 12.

The beverage receptacle 12 generally houses, holds, or contains a user's beverage. Advantageously, the beverage receptacle 12 includes a cylindrical sidewall 22 and a support surface 24; however, other shapes and configurations for the receptacle 12 are certainly possible. An upper rim 26 can be provided to nest with the bezel 20, but in some embodiments, there may not be a separate upper rim 26 or bezel 20, as the upper rim portion could be one integral piece or structure. In yet other embodiments, the cylindrical sidewall 22 may be integral with the opening 16 such that there is not a separate rim portion at the top of the cupholder 10. The beverage receptacle 12 of the cupholder 10 may be made from any operable material, such as aluminum or stainless steel to cite two examples. Aluminum or stainless steel may be more advantageous with marine applications, as they are durable and can help sustain various environmental impacts. Further, these materials are able to transfer heat efficiently from the thermal control device 14 to help promote heating or cooling of a user's beverage.

The thermal control device 14 is configured to change a temperature of the beverage receptacle 12. In some embodiments, the thermal control device 14 is a beverage warmer, and in other embodiments, the thermal control device is a beverage cooler. In an advantageous embodiment, as described herein, the thermal control device 14 can be used to either heat the beverage receptacle 12, or cool the beverage receptacle. The thermal control device 14, as detailed below, is particularly adapted to accommodate a drain hole 28 and drain passageway 30, so that fluid within the beverage receptacle 12 can adequately drain. This configuration is advantageous as it can better tolerate external environments, while being able to efficiently provide heating and cooling capabilities to a user of the vehicle, particularly in marine-based applications.

The thermal control device 14 in the illustrated embodiment includes a Peltier device 32, a cool sink 34, a heat sink 36, and a fan 38. The Peltier device 32 is a thermoelectric device configured to produce heat on one side and remove heat (i.e., cool) on the other side. When current flows in the opposite direction, the sides flip such that the heat side becomes the cooling side and the cooling side becomes the heat side. The Peltier device 32 is modified to include a Peltier channel 40. The Peltier channel 40 is a cylindrical channel or opening in the center of the Peltier device 32 that is designed to accommodate the drain passageway 30. Accordingly, fluid flow from the beverage receptacle 12 can pass through the Peltier device 32 via the drain passageway 30 and the Peltier channel 40.

The cool sink 34 is situated directly between the Peltier device 32 and the beverage receptacle 12. The cool sink 34 can be made of any operable material, and in this embodiment, is advantageously made from copper (e.g., 99.9 wt % copper) or a copper alloy. Other materials are possible, such as aluminum, which may be more cost effective than copper-based materials. The cool sink 34 includes a cool sink channel 42. The cool sink channel 42 is a cylindrical channel or opening in the center of the cool sink 34 that is designed to accommodate the drain passageway 30. Accordingly, fluid flow from the beverage receptacle 12 can pass through the cool sink 34 via the drain passageway 30 and the cool sink channel 42.

The heat sink 36 helps remove heat from the Peltier device 32 when the cooling mode is activated. In an advantageous embodiment, an aluminum-based material is used for the heat sink 36, T-6061 in one particular embodiment, although other operable materials are possible. The heat sink 36 includes a heat sink channel 44. The heat sink channel 44 is a cylindrical channel or opening in the center of the heat sink 36 that is designed to accommodate the drain passageway 30. Accordingly, fluid flow from the beverage receptacle 12 can pass through the heat sink 36 via the drain passageway 30 and the heat sink channel 44. The heat sink 36 is advantageously a perforated heat sink having a plurality of perforations 46 (only a few are labeled in FIG. 1 for clarity purposes). The perforations 46 allow for better heat removal, as they increase the exposed surface area of the heat sink 36 without adding space to the entirety of the thermal control device 14. Further, heat can be removed from the internal area, closer to the Peltier device 32, not just the surface. The perforations 46 are configured to cover the surface 48 of the heat sink 36, and extend in a plurality of rows 50 (only a few of which are labeled for clarity purposes), with each perforation 46 extending into and through a body 52 of the heat sink 36. Each row 50 in this embodiment includes four perforations 46 that are generally evenly distributed from an upstream end of the heat sink 36 to a downstream end further from the beverage receptacle 12. The number of perforations 46 will depend on the desired size of the heat sink, cupholder, and/or the size of the perforations themselves. In one embodiment, there are more than twenty perforations (e.g., 40-60), but this number can vary depending on the implementation. Advantageously, the perforations 46 constitute more than 20% of the surface 48 of the heat sink 36. In some embodiments, the perforated heat sink 36 may not be used, and an alternative heat sink 36 may be used instead, such as a finned design.

The fan 38 is situated such that it is downstream of the other components of the thermal control device 14, such that airflow can be directed from the fan to the Peltier device 32 and up to the beverage receptacle 12. The fan 38 includes a fan channel 54. The fan channel 54 is a cylindrical channel or opening in the center of the fan 38 that is designed to accommodate the drain passageway 30. Accordingly, fluid flow from the beverage receptacle 12 can pass through the fan 38 via the drain passageway 30 and the fan channel 54. As will be described further below with respect to FIG. 3, the fan 38 is configured to operate only when in a cooling mode. The thermal control device 14 is sufficiently efficient in the heating mode so it may not be necessary to run the fan 38 in the heating mode, although the circuitry could be adapted to facilitate such operation if desired.

The thermal control device 14 may include other components such as a commutator 56 which can be used to switch the polarity of the DC circuit to accommodate both the heating and cooling modes. As with the other components of the thermal control device 14, the commutator 56 includes a commutator channel 58, which is a cylindrical channel or opening in the center of the commutator 56 that is designed to accommodate the drain passageway 30. Accordingly, fluid flow from the beverage receptacle 12 can pass through the commutator 56 via the drain passageway 30 and the commutator channel 58. Other components of the thermal control device 14 may include various retaining nuts or clips 60, 62, and one or more spacers 64. A bearing 66 can also be included to help accommodate the rotational motion of the fan 38.

Figure 2:
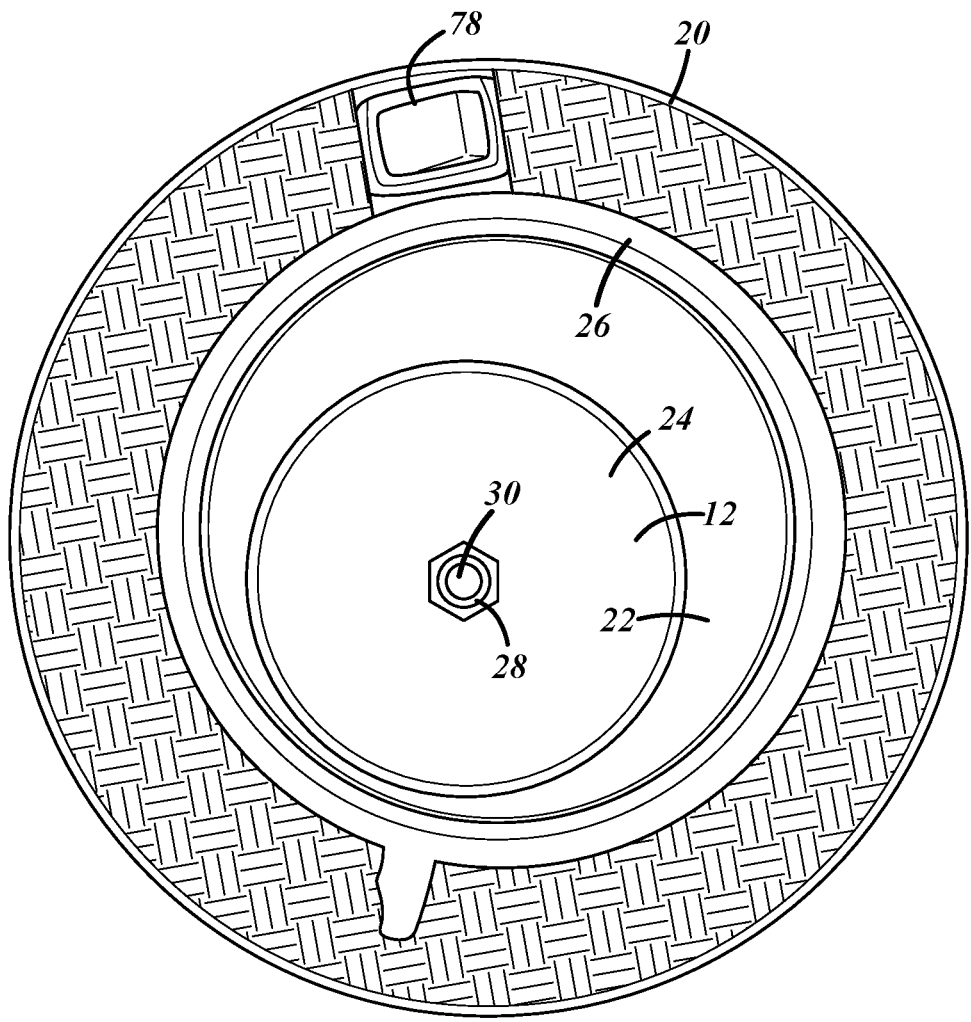
FIG. 2 is a top view of a thermally controllable cupholder according to one embodiment.

FIG. 2 shows the drain hole 28 which is situated in the support surface 24 of the beverage receptacle 12. The drain hole 28 leads to the drain passageway 30, which is shown and described above with respect to FIG. 1. The drain hole 28 and the drain passageway 30 allow for the passage of fluid from out of the interior of the beverage receptacle 12 to another location. This is particularly advantageous when the beverage receptacle 12 is at least partially exposed to the outside environment (e.g., water on a boat), as it helps prevent fluid buildup in the receptacle. The drain hole 28 may be an integral part of the drain passageway 30 and/or an integral part of the support surface 24. Other drain configurations are certainly possible. For example, in some embodiments, there could be multiple drain holes culminating into one drain passageway. Returning to FIG. 1, the drain passageway 30 extends from the drain hole 28 to an extension portion 68. The extension portion 68 in this embodiment is a protrusion (e.g., about 1 inch from the bottom of the clip 62) which allows for the attachment of a drain tube 70, which is schematically represented. The drain tube 70 may provide for draining through the hull, or to a bilge 72 of the marine vehicle 18, which is also schematically represented. To help promote fluid flow to the drain tube 70, each of the channels 40, 42, 44, 54, 58 are coaxially aligned to accommodate an advantageously straight drain passageway 30. Accordingly, in the illustrated embodiment, the thermal control device 14 includes a set of coaxially aligned channels to accommodate the drain passageway 30. Each channel 40, 42, 44, 54, 58 comprises a hole or recess extending through the respective component, in which the drain passageway can run through or passes through. In some embodiments, the channels themselves constitute the drain passageway. In such an embodiment, each channel may be lined and/or sealed with a waterproof coating or the like.

The thermally controllable cupholder 10 can have other features, such as a blue light 74 and/or a red light 76. The blue light 74 can be an LED strip that is illuminated when in a cooling mode, and the red light 76 can be an LED strip that is operated when in a heating mode. In other embodiments, a single RGB LED may be used to effectuate the same color variations. The light sources 74, 76 may be implemented in the bezel portion 20, or may be located in another operable location, such as below a translucent or transparent bezel 20 or upper rim 26. In yet other embodiments, a waveguide, light guide, or other light source may be used to cylindrically disburse light around the beverage receptacle 12. Other lighting configurations are certainly possible.

Figure 3:
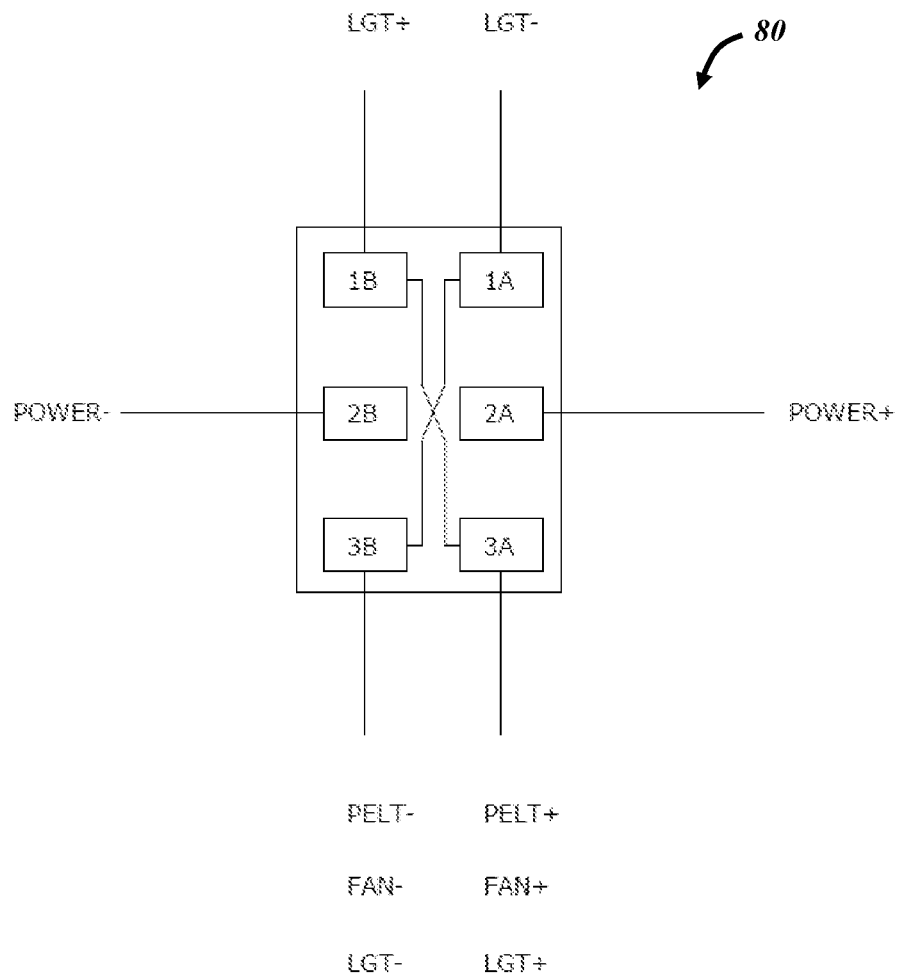
FIG. 3 is an example switch schematic that may be used with a thermally controllable cupholder, such as the cupholders illustrated in FIGS. 1 and 2.

A switch 78 is provided to control the various electrical components of the cupholder 10. In an advantageous embodiment, the switch 78 is a three-way rocker switch wired in accordance with the schematic 80 illustrated in FIG. 3. Power can be provided from a main power source for the vehicle, a separate, dedicated battery, or another operable source. As shown in FIG. 3 and described above, the fan 38 is configured to only operate while in a cooling mode, and not while in the heating mode. In some embodiments in which the thermally controllable cupholder only provides for cooling or heating, but not both, the switch 78 may be a two-position switch instead of a three-position switch. In such an embodiment, the lighting scheme could be adjusted to provide for clear or red light during heating, or clear or blue light during cooling. If heating only, the fan 38 can be removed. Other configurational adjustments, whether functional or aesthetic, are certainly possible.

Figure 4:
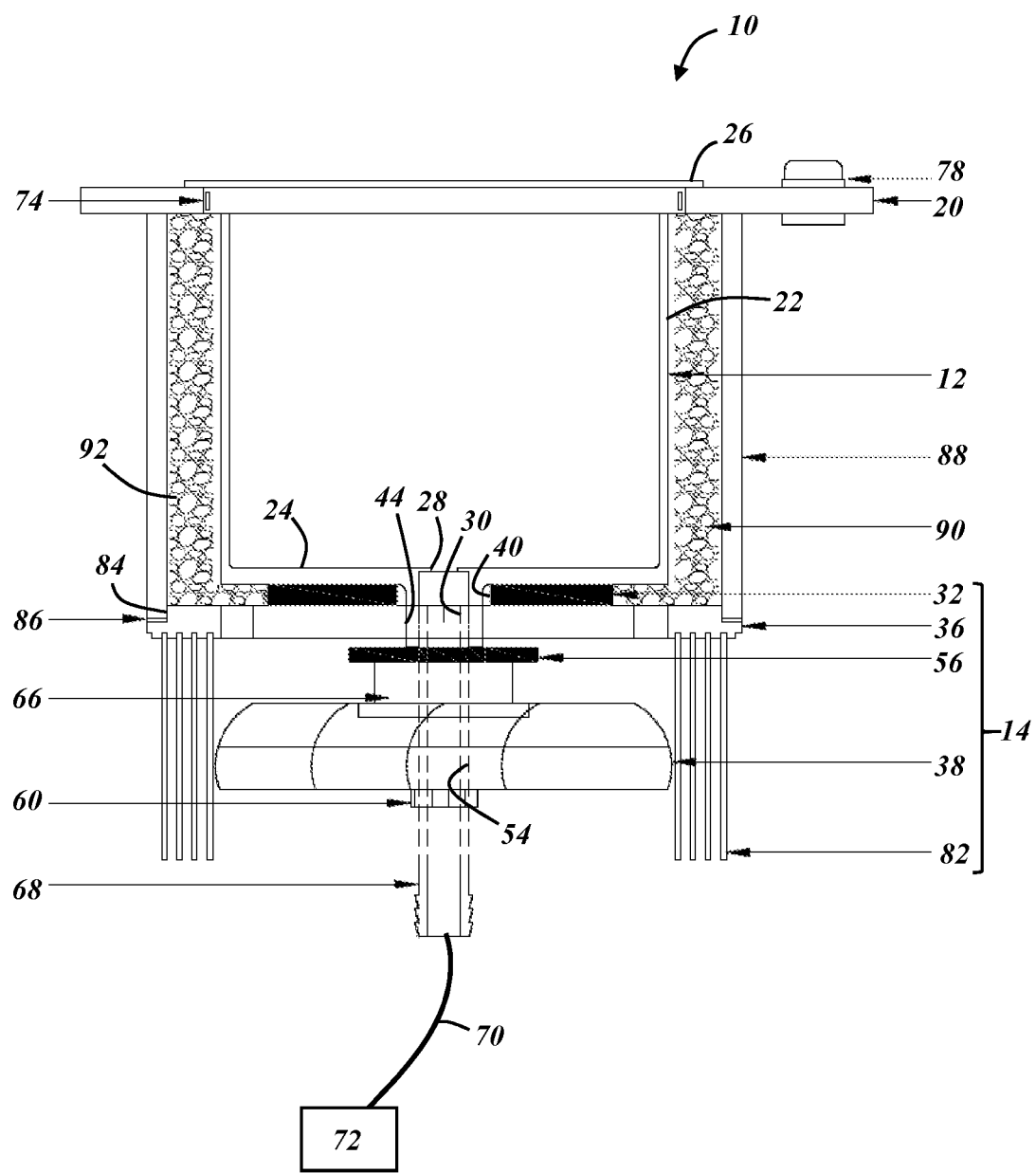
FIG. 4 is a schematic of a thermally controllable cupholder according to another embodiment.

FIG. 4 shows another embodiment of a thermally controllable cupholder 10. This embodiment does not have a separate cool sink, and also illustrates another possible implementation for the heat sink 36. This heat sink 36 includes a plurality of cooling fins 82 to help the thermal control device 14 with heat dissipation. The heat sink 36 includes an outer cylindrical groove 84 for seating a gasket 86. The cylindrical groove 84 and gasket 86 provides for a sealing arrangement with an outer casing 88. The outer casing 88 in this embodiment includes the bezel 20. The outer casing 88 is structured to form an interstitial space 90 between the beverage receptacle 12 that is filled with foam insulation 92. The foam insulation 92 is designed in this example to directly contact the cylindrical sidewall 22, the Peltier device 32, and the heat sink 36. The overall shape of the outer casing 88 and the interstitial space 90 can help the foam insulation 92 directly contact these areas of the cupholder 10, in order to help bolster thermal performance.

Figure 6:
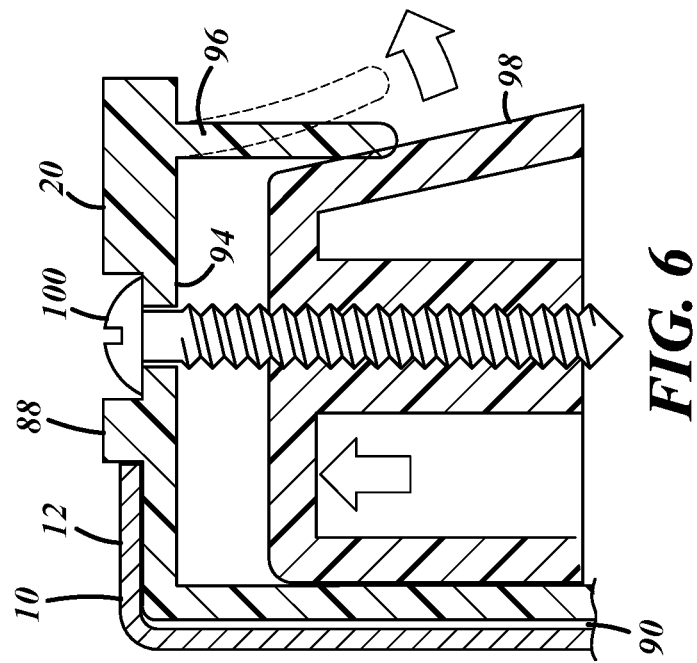
FIG. 6 illustrates a mounting arrangement for the outer casing of FIG. 5.
Figure 5:
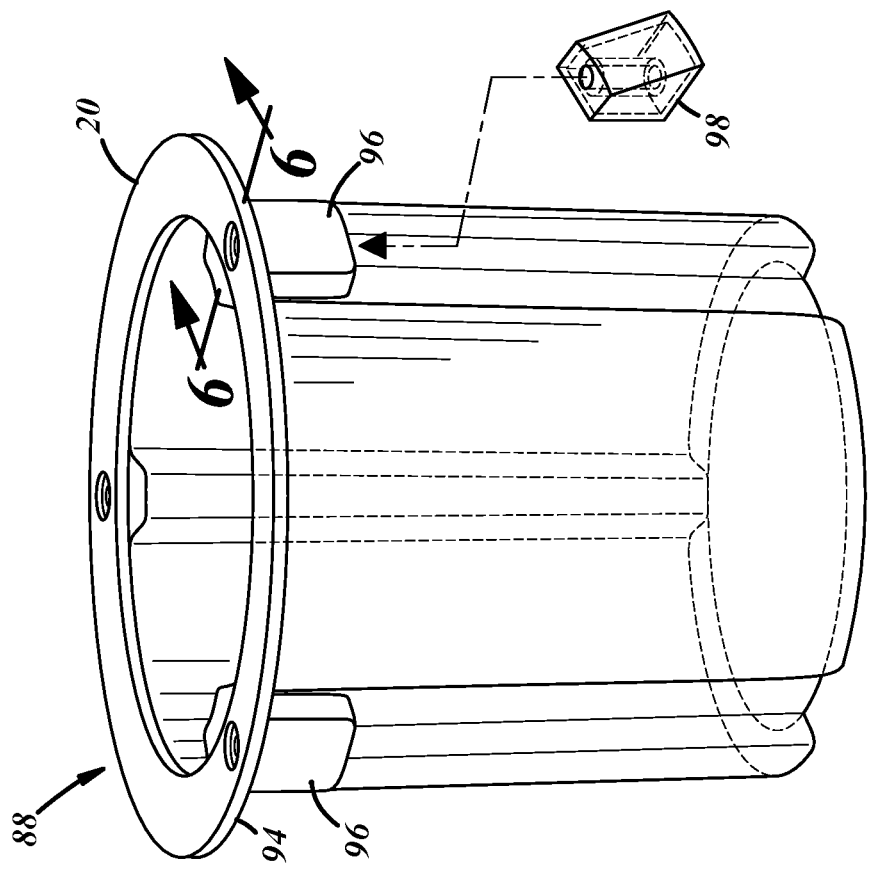
FIG. 5 shows an example outer casing that can be used with the thermally controllable cupholder, such as the cupholders illustrated in FIGS. 1, 2, and 4.

FIGS. 5 and 6 illustrate another embodiment of the outer casing 88. In this embodiment, an underside 94 of the bezel 20 includes a plurality of flaring tabs 96, each of which being configured to retain a mounting wedge 98. This embodiment includes three flaring tabs 96 that are circumferentially spaced around the underside 94 of the bezel 20. As the mounting wedge 98 is drawn up by the retaining fastener or screw 100, the flaring tab 96 flares out for retention. This can provide for a more reliable attachment of the cupholder assembly 10 and outer casing 88 to the boat or other vehicle to which it is installed.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A thermally controllable cupholder, comprising: a beverage receptacle having a support surface configured to support a weight of a beverage; and a thermal control device configured to change a temperature of the beverage receptacle, wherein the thermal control device includes a perforated heat sink and a fan, with the heat sink and the fan being located beneath the support surface of the beverage receptacle, wherein the beverage receptacle has a drain hole that connects the beverage receptacle to a drain passageway.

2. The thermally controllable cupholder of claim 1, wherein the perforated heat sink surrounds the drain passageway.

3. The thermally controllable cupholder of claim 1, comprising an outer casing and an interstitial space between the beverage receptacle and the outer casing.

4. The thermally controllable cupholder of claim 3, wherein the interstitial space includes a foam insulation and the foam insulation contacts the heat sink.

5. The thermally controllable cupholder of claim 1, wherein the perforated heat sink includes a plurality of perforations over a surface of a body of the perforated heat sink.

6. The thermally controllable cupholder of claim 5, wherein the plurality of perforations cover 20% or more of the surface of the body.

7. The thermally controllable cupholder of claim 5, wherein the plurality of perforations extend in a plurality of rows of perforations.

8. The thermally controllable cupholder of claim 5, wherein each perforation of the plurality of perforations extends into and through the body of the perforated heat sink.

9. The thermally controllable cupholder of claim 8, wherein two or more perforations of the plurality of perforations create fins in the body.

10. A thermally controllable cupholder, comprising:
a beverage receptacle having a support surface configured to support a weight of a beverage, wherein the support surface has a drain hole that connects the beverage receptacle to a drain passageway; and a heat sink having a body and a plurality of perforations in the body, wherein two or more perforations of the plurality of perforations create fins in the body, and wherein the drain passageway and the fins extend at least partially underneath the support surface of the beverage receptacle.

11. The thermally controllable cupholder of claim 10, wherein the body of the heat sink surrounds the drain passageway.

12. The thermally controllable cupholder of claim 10, wherein each perforation of the plurality of perforations extends into and through the body of the heat sink.

13. The thermally controllable cupholder of claim 12, wherein the plurality of perforations cover 20% or more of a surface of the body.

14. The thermally controllable cupholder of claim 10, comprising an outer casing and an interstitial space between the beverage receptacle and the outer casing.

15. The thermally controllable cupholder of claim 14, wherein the interstitial space includes a foam insulation and the foam insulation contacts the heat sink.

16. A thermally controllable cupholder, comprising:

a beverage receptacle having a support surface configured to support a weight of a beverage, the support surface having a drain hole that connects the beverage receptacle to a drain passageway; and a beverage heater and cooler configured to change a temperature of the beverage receptacle, wherein the beverage heater and cooler includes a plurality of fins extending underneath the support surface of the beverage receptacle.

* * * * *